(12) United States Patent
Yang et al.

(10) Patent No.: US 8,024,290 B2
(45) Date of Patent: Sep. 20, 2011

(54) DATA SYNCHRONIZATION AND DEVICE HANDLING

(75) Inventors: Lie Yang, Palo Alto, CA (US); John A. Traver, Los Altos, CA (US); Venkatachary Srinivasan, Sunnyvale, CA (US); Marco Boerries, Los Altos Hills, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1107 days.

(21) Appl. No.: 11/273,891

(22) Filed: Nov. 14, 2005

(65) Prior Publication Data

US 2007/0112880 A1 May 17, 2007

(51) Int. Cl.
*G06F 7/00* (2006.01)
*G06F 17/00* (2006.01)
*G06F 15/16* (2006.01)

(52) U.S. Cl. ........................................ 707/625; 709/203

(58) Field of Classification Search ................... 707/200, 707/201, 625, 624, 610, 609; 709/201, 203
See application file for complete search history.

(56) References Cited

U.S. PATENT DOCUMENTS

| | | | |
|---|---|---|---|
| 4,354,230 A | 10/1982 | Murphy et al. |
| 4,631,146 A | 12/1986 | Gebauer et al. |
| 5,220,657 A | 6/1993 | Bly et al. |
| 5,371,743 A | 12/1994 | DeYesso et al. |
| 5,371,882 A | 12/1994 | Ludlam |
| 5,436,960 A | 7/1995 | Campana, Jr. et al. |
| 5,440,719 A | 8/1995 | Hanes et al. |
| 5,457,478 A | 10/1995 | Frank |
| 5,475,813 A | 12/1995 | Cieslak et al. |
| 5,481,668 A | 1/1996 | Marcus |
| 5,625,757 A | 4/1997 | Kageyama et al. |
| 5,663,948 A | 9/1997 | Kobunaya |
| 5,668,943 A | 9/1997 | Attanasio et al. |
| 5,684,952 A | 11/1997 | Stein |
| 5,684,990 A | 11/1997 | Boothby |

(Continued)

FOREIGN PATENT DOCUMENTS

EP 0 144 815 A1 6/1985

(Continued)

OTHER PUBLICATIONS

Aprilog.com. (2000). "Plcc-adapter.com," located at <http://plcc-adapter.com/Site/ZIF-PLCC-to-PLCC-adapters.htm>, last visited on Dec. 7, 2005, 3 pages.

(Continued)

*Primary Examiner* — Brent Stace
(74) *Attorney, Agent, or Firm* — James J. DeCarlo; Greenberg Traurig, LLP (57) ABSTRACT

In one example, a synchronization server includes logic operable to engage in a first synchronization session with a client device, wherein client modifications and server modifications may be exchanged based, at least in part, on synchronization data stored locally. The synchronization server further includes logic operable to initiate a query of a remote database (e.g., having data associated with the synchronization data) to determine differences between the synchronization data stored locally and associated data stored remotely. The synchronization server is further operable to initiate an exchange of further server modifications based on the differences between the synchronization data stored locally and the associated data stored remotely. In one example, the server may engage in a second synchronization session with the client device to update the client device with differences to the synchronization data stored locally and the remote database.

27 Claims, 4 Drawing Sheets

U.S. PATENT DOCUMENTS

| | | | |
|---|---|---|---|
| 5,727,202 A | 3/1998 | Kucala | |
| 5,742,905 A | 4/1998 | Pepe et al. | |
| 5,764,908 A | 6/1998 | Shoji et al. | |
| 5,774,668 A | 6/1998 | Choquier et al. | |
| 5,787,437 A | 7/1998 | Potterveld et al. | |
| 5,814,798 A | 9/1998 | Zancho | |
| 5,852,724 A | 12/1998 | Glenn, II et al. | |
| 5,864,653 A | 1/1999 | Tavallaei et al. | |
| 5,870,759 A * | 2/1999 | Bauer et al. | 1/1 |
| 5,956,719 A | 9/1999 | Kudo et al. | |
| 6,021,449 A | 2/2000 | Chow et al. | |
| 6,041,333 A | 3/2000 | Bretschneider et al. | |
| 6,069,896 A | 5/2000 | Borgstahl et al. | |
| 6,092,169 A | 7/2000 | Murthy et al. | |
| 6,105,067 A | 8/2000 | Batra | |
| 6,108,779 A | 8/2000 | Dean et al. | |
| 6,131,096 A | 10/2000 | Ng et al. | |
| 6,134,581 A | 10/2000 | Ismael et al. | |
| 6,141,690 A | 10/2000 | Weiman | |
| 6,144,999 A | 11/2000 | Khalidi et al. | |
| 6,157,944 A | 12/2000 | Pedersen | |
| 6,163,856 A | 12/2000 | Dion et al. | |
| 6,170,065 B1 | 1/2001 | Kobata et al. | |
| 6,182,142 B1 | 1/2001 | Win et al. | |
| 6,236,991 B1 | 5/2001 | Frauenhofer et al. | |
| 6,256,676 B1 | 7/2001 | Taylor et al. | |
| 6,304,981 B1 | 10/2001 | Spears et al. | |
| 6,311,187 B1 | 10/2001 | Jeyaraman | |
| 6,452,809 B1 | 9/2002 | Jackson et al. | |
| 6,457,062 B1 | 9/2002 | Pivowar et al. | |
| 6,463,032 B1 | 10/2002 | Lau et al. | |
| 6,463,463 B1 | 10/2002 | Godfrey et al. | |
| 6,489,954 B1 | 12/2002 | Powlette | |
| 6,496,858 B1 | 12/2002 | Frailong et al. | |
| 6,496,941 B1 | 12/2002 | Segal et al. | |
| 6,505,236 B1 | 1/2003 | Pollack | |
| 6,510,050 B1 | 1/2003 | Lee et al. | |
| 6,530,083 B1 | 3/2003 | Liebenow | |
| 6,543,004 B1 | 4/2003 | Cagle et al. | |
| 6,571,354 B1 | 5/2003 | Parks et al. | |
| 6,577,905 B1 | 6/2003 | Robertson et al. | |
| 6,596,077 B2 | 7/2003 | Myerson | |
| 6,611,849 B1 | 8/2003 | Raff et al. | |
| 6,622,192 B2 | 9/2003 | Chou et al. | |
| 6,633,907 B1 | 10/2003 | Spencer et al. | |
| 6,633,910 B1 | 10/2003 | Rajan et al. | |
| 6,636,873 B1 | 10/2003 | Carini et al. | |
| 6,640,222 B1 | 10/2003 | Briancon | |
| 6,647,260 B2 | 11/2003 | Dusse et al. | |
| 6,654,500 B1 | 11/2003 | Lyu | |
| 6,670,982 B2 | 12/2003 | Clough et al. | |
| 6,671,824 B1 | 12/2003 | Hyland et al. | |
| 6,687,716 B1 | 2/2004 | Bradley | |
| 6,691,243 B1 | 2/2004 | Belgardt et al. | |
| 6,697,977 B2 | 2/2004 | Ozaki | |
| 6,711,579 B2 | 3/2004 | Balakrishnan | |
| 6,728,786 B2 | 4/2004 | Hawkins et al. | |
| 6,738,808 B1 | 5/2004 | Zellner et al. | |
| 6,744,874 B2 | 6/2004 | Wu | |
| 6,748,570 B1 | 6/2004 | Bahrs et al. | |
| 6,751,661 B1 | 6/2004 | Geddes | |
| 6,766,469 B2 | 7/2004 | Larson et al. | |
| 6,769,124 B1 | 7/2004 | Schoening et al. | |
| 6,785,680 B1 | 8/2004 | Cragun | |
| 6,785,868 B1 | 8/2004 | Raff | |
| 6,799,224 B1 | 9/2004 | Dellacona | |
| 6,813,770 B1 | 11/2004 | Allavarpu et al. | |
| 6,822,951 B1 | 11/2004 | Patton | |
| 6,834,195 B2 | 12/2004 | Brandenberg et al. | |
| 6,839,564 B2 | 1/2005 | Sutinen et al. | |
| 6,839,744 B1 | 1/2005 | Kloba et al. | |
| 6,848,034 B2 | 1/2005 | Cohn et al. | |
| 6,857,123 B1 | 2/2005 | Nuxoll et al. | |
| 6,859,834 B1 | 2/2005 | Arora et al. | |
| 6,865,157 B1 | 3/2005 | Scott et al. | |
| 6,865,261 B1 | 3/2005 | Rao et al. | |
| 6,865,597 B1 | 3/2005 | Bandopadhyay et al. | |
| 6,868,444 B1 | 3/2005 | Kim et al. | |
| 6,883,034 B1 | 4/2005 | Pelavin et al. | |
| 6,892,311 B2 | 5/2005 | Coppock et al. | |
| 6,895,480 B2 | 5/2005 | Heil | |
| 6,898,422 B2 | 5/2005 | Bern et al. | |
| 6,901,429 B2 | 5/2005 | Dowling | |
| 6,904,043 B1 | 6/2005 | Merchant et al. | |
| 6,931,454 B2 | 8/2005 | Deshpande et al. | |
| 6,944,662 B2 | 9/2005 | Devine et al. | |
| 6,965,929 B2 | 11/2005 | Kumar | |
| 7,000,032 B2 | 2/2006 | Kloba et al. | |
| 7,020,662 B2 | 3/2006 | Boreham et al. | |
| 7,051,087 B1 | 5/2006 | Bahl et al. | |
| 7,051,088 B2 | 5/2006 | Sesek | |
| 7,085,822 B1 | 8/2006 | Donatelli et al. | |
| 7,085,824 B2 | 8/2006 | Forth et al. | |
| 7,089,259 B1 | 8/2006 | Kouznetsov et al. | |
| 7,089,297 B1 | 8/2006 | Salas et al. | |
| 7,093,006 B2 | 8/2006 | Sanjeev et al. | |
| 7,139,983 B2 | 11/2006 | Kelts | |
| 2001/0042124 A1 | 11/2001 | Barron | |
| 2001/0047402 A1 | 11/2001 | Saimi et al. | |
| 2001/0049286 A1 | 12/2001 | Hansmann et al. | |
| 2002/0016818 A1 | 2/2002 | Kirani et al. | |
| 2002/0032020 A1 | 3/2002 | Brown et al. | |
| 2002/0039420 A1 | 4/2002 | Shacham et al. | |
| 2002/0116396 A1 | 8/2002 | Somers et al. | |
| 2002/0124114 A1 | 9/2002 | Bottom et al. | |
| 2002/0129109 A1 | 9/2002 | Nozaki et al. | |
| 2002/0133821 A1 | 9/2002 | Shteyn | |
| 2002/0161735 A1 * | 10/2002 | Cheng et al. | 707/1 |
| 2002/0161769 A1 | 10/2002 | Sutinen et al. | |
| 2002/0174180 A1 | 11/2002 | Brown et al. | |
| 2002/0194083 A1 | 12/2002 | Balabhadrapatruni et al. | |
| 2003/0004884 A1 | 1/2003 | Kitazato | |
| 2003/0014503 A1 | 1/2003 | Legout et al. | |
| 2003/0018922 A1 | 1/2003 | Litwin, Jr. et al. | |
| 2003/0065717 A1 | 4/2003 | Saito et al. | |
| 2003/0074358 A1 | 4/2003 | Sarbaz et al. | |
| 2003/0081557 A1 | 5/2003 | Mettala et al. | |
| 2003/0084177 A1 | 5/2003 | Mulligan | |
| 2003/0097361 A1 | 5/2003 | Huang et al. | |
| 2003/0097381 A1 | 5/2003 | Detweiler et al. | |
| 2003/0097487 A1 | 5/2003 | Rietze et al. | |
| 2003/0130882 A1 | 7/2003 | Shuttleworth et al. | |
| 2003/0143983 A1 | 7/2003 | Crampton | |
| 2003/0145021 A1 | 7/2003 | Parkkinen | |
| 2003/0145074 A1 | 7/2003 | Penick | |
| 2003/0147219 A1 | 8/2003 | Chou | |
| 2003/0172138 A1 | 9/2003 | McCormack et al. | |
| 2003/0172139 A1 | 9/2003 | Srinivasan et al. | |
| 2003/0172175 A1 | 9/2003 | McCormack et al. | |
| 2003/0177171 A1 | 9/2003 | Brown, Jr. et al. | |
| 2003/0195922 A1 | 10/2003 | Andrews et al. | |
| 2003/0212684 A1 | 11/2003 | Meyer et al. | |
| 2003/0212739 A1 | 11/2003 | Boucher et al. | |
| 2003/0212826 A1 | 11/2003 | Rapakko et al. | |
| 2003/0217125 A1 | 11/2003 | Brancati et al. | |
| 2004/0003132 A1 | 1/2004 | Stanley et al. | |
| 2004/0006551 A1 | 1/2004 | Sahinoja et al. | |
| 2004/0010569 A1 | 1/2004 | Thomas et al. | |
| 2004/0019614 A1 * | 1/2004 | Wang | 707/202 |
| 2004/0034692 A1 | 2/2004 | Eguchi et al. | |
| 2004/0044799 A1 | 3/2004 | Sivaraman et al. | |
| 2004/0059834 A1 | 3/2004 | Taylor et al. | |
| 2004/0068516 A1 | 4/2004 | Lee et al. | |
| 2004/0083472 A1 | 4/2004 | Rao et al. | |
| 2004/0088390 A1 | 5/2004 | Hall et al. | |
| 2004/0088414 A1 | 5/2004 | Flynn et al. | |
| 2004/0103157 A1 | 5/2004 | Requena et al. | |
| 2004/0117507 A1 * | 6/2004 | Torma | 709/248 |
| 2004/0136404 A1 * | 7/2004 | Mahonen et al. | 370/503 |
| 2004/0143836 A1 | 7/2004 | McCormack et al. | |
| 2004/0151125 A1 | 8/2004 | Holmeide et al. | |
| 2004/0153576 A1 * | 8/2004 | Hansmann et al. | 709/248 |
| 2004/0179529 A1 | 9/2004 | Pettey et al. | |
| 2004/0181580 A1 | 9/2004 | Baranshamaje | |
| 2004/0199614 A1 | 10/2004 | Shenfield et al. | |
| 2004/0210450 A1 | 10/2004 | Atencio et al. | |
| 2004/0215749 A1 | 10/2004 | Tsao | |

| | | | |
|---|---|---|---|
| 2004/0225693 A1 | 11/2004 | Ganji et al. | |
| 2004/0230661 A1 | 11/2004 | Rashid et al. | |
| 2004/0246996 A1 | 12/2004 | Engel | |
| 2004/0247090 A1 | 12/2004 | Nurmela | |
| 2004/0252700 A1 | 12/2004 | Anandakumar et al. | |
| 2005/0003807 A1 | 1/2005 | Rosenfelt et al. | |
| 2005/0010607 A1 | 1/2005 | Parker et al. | |
| 2005/0015430 A1 | 1/2005 | Rothman et al. | |
| 2005/0021637 A1 | 1/2005 | Cox | |
| 2005/0025316 A1 | 2/2005 | Pelly et al. | |
| 2005/0041652 A1 | 2/2005 | Roy | |
| 2005/0044235 A1 | 2/2005 | Balahura et al. | |
| 2005/0055698 A1 | 3/2005 | Sasaki et al. | |
| 2005/0059393 A1 | 3/2005 | Knowles | |
| 2005/0060355 A1 | 3/2005 | Kadyk et al. | |
| 2005/0063398 A1 | 3/2005 | Choudhury et al. | |
| 2005/0063543 A1 | 3/2005 | Kayalackakom et al. | |
| 2005/0076086 A1 | 4/2005 | Budd et al. | |
| 2005/0080891 A1 | 4/2005 | Cauthron | |
| 2005/0100329 A1 | 5/2005 | Lao et al. | |
| 2005/0108289 A1 | 5/2005 | East et al. | |
| 2006/0020433 A1* | 1/2006 | Taha et al. | 703/2 |
| 2006/0129827 A1 | 6/2006 | Kim et al. | |
| 2006/0259511 A1 | 11/2006 | Boerries et al. | |
| 2007/0014243 A1 | 1/2007 | Meyer et al. | |
| 2007/0014244 A1 | 1/2007 | Srinivasan et al. | |
| 2007/0014277 A1 | 1/2007 | Ebbesen et al. | |
| 2007/0014278 A1 | 1/2007 | Ebbesen et al. | |
| 2007/0014300 A1 | 1/2007 | Breuer et al. | |
| 2007/0014303 A1 | 1/2007 | Schulz et al. | |
| 2007/0014307 A1 | 1/2007 | Srinivasan et al. | |
| 2007/0016632 A1 | 1/2007 | Schulz et al. | |
| 2007/0016636 A1 | 1/2007 | Boerries et al. | |
| 2007/0016646 A1 | 1/2007 | Tendjoukian et al. | |
| 2007/0016676 A1 | 1/2007 | Breuer et al. | |
| 2007/0028000 A1 | 2/2007 | Ebbesen et al. | |
| 2007/0028293 A1 | 2/2007 | Boerries et al. | |
| 2007/0038703 A1 | 2/2007 | Tendjoukian et al. | |
| 2007/0088764 A1* | 4/2007 | Yoon et al. | 707/201 |
| 2007/0100856 A1 | 5/2007 | Ebbesen | |
| 2007/0100975 A1 | 5/2007 | Srinivasan et al. | |
| 2007/0101021 A1 | 5/2007 | Meyer et al. | |
| 2007/0101022 A1 | 5/2007 | Schulz et al. | |

FOREIGN PATENT DOCUMENTS

| | | |
|---|---|---|
| EP | 0 144 815 B1 | 6/1985 |
| EP | 0 772 327 A2 | 5/1997 |
| EP | 0 772 327 A3 | 5/1997 |
| EP | 0 772 327 B1 | 5/1997 |
| EP | 0 909 058 A2 | 4/1999 |
| EP | 0 909 058 A3 | 4/1999 |
| EP | 0 909 058 B1 | 4/1999 |
| EP | 0 986 225 A1 | 3/2000 |
| EP | 1 126 387 A2 | 8/2001 |
| EP | 1 126 387 A3 | 8/2001 |
| EP | 1 221 661 A2 | 7/2002 |
| EP | 1 221 661 A3 | 7/2002 |
| EP | 1 280 314 A2 | 1/2003 |
| EP | 1 296 252 A1 | 3/2003 |
| EP | 1 406 458 A1 | 4/2004 |
| EP | 1 418 771 A2 | 5/2004 |
| EP | 1 418 772 A2 | 5/2004 |
| EP | 1 443 701 A1 | 8/2004 |
| JP | 5-67059 A | 3/1993 |
| JP | 7-262104 A | 10/1995 |
| JP | 10-308758 A | 11/1998 |
| JP | 2000-209254 A | 7/2000 |
| JP | 2001-326695 A | 11/2001 |
| JP | 2002-198925 A | 7/2002 |
| WO | WO-97/28505 A1 | 8/1997 |
| WO | WO-98/59477 A1 | 12/1998 |
| WO | WO-99/34305 A1 | 7/1999 |
| WO | WO-99/61984 A1 | 12/1999 |
| WO | WO-99/62268 A2 | 12/1999 |
| WO | WO-99/62268 A3 | 12/1999 |
| WO | WO-99/65256 A2 | 12/1999 |
| WO | WO-99/65256 A3 | 12/1999 |
| WO | WO-99/65256 C1 | 12/1999 |
| WO | WO-00/67176 A2 | 11/2000 |
| WO | WO-00/67176 A3 | 11/2000 |
| WO | WO-00/67176 C1 | 11/2000 |
| WO | WO-01/75684 A2 | 10/2001 |
| WO | WO-01/75684 A3 | 10/2001 |
| WO | WO-01/97442 A2 | 12/2001 |
| WO | WO-01/97442 A3 | 12/2001 |
| WO | WO-02/27547 A1 | 4/2002 |
| WO | WO-02/33593 A1 | 4/2002 |
| WO | WO-02/091224 A1 | 11/2002 |
| WO | WO-03/005206 A2 | 1/2003 |
| WO | WO-03/005206 A3 | 1/2003 |
| WO | WO-03/079144 A2 | 9/2003 |
| WO | WO-03/079144 A3 | 9/2003 |
| WO | WO-03/083691 A1 | 10/2003 |
| WO | WO-03/102778 A2 | 12/2003 |
| WO | WO-03/102778 A3 | 12/2003 |
| WO | WO-2004/040470 A1 | 5/2004 |
| WO | WO-2004/044773 A1 | 5/2004 |
| WO | WO-2004/049104 A2 | 6/2004 |
| WO | WO-2004/049104 A3 | 6/2004 |
| WO | WO-2005/001665 A2 | 1/2005 |
| WO | WO-2005/008998 A1 | 1/2005 |
| WO | WO-2005/010715 A2 | 2/2005 |
| WO | WO-2005/011215 A1 | 2/2005 |

OTHER PUBLICATIONS

Barbir, A. et al. (Jul. 2003). "RFC 3568: Known Content Network (CN) Request-Routing Mechanisms," located at <http://www.faqs.org/rfcs/rfc3568.html>, last visited on Dec. 6, 2005, 14 pages.

Cherniak, M. et al. (Sep. 11, 2001). "Data Management for Pervasive Computing," VLDB, Rome, Italy, pp. 71-140.

Core Solutions. (Date Unknown). "IT Device Repair (ITDR)," 1 page.

Ericsson et al. (Oct. 2, 2002). "SynML Sync Protocol, Version 1.1.1," located at <http://www.syncml.org/docs/syncml_sync_protocol_v111_20021002.pdf>, 53 pages.

Expand Networks. (Apr. 2004). "The Role of Accelerators in Disaster Recovery: Enabling Cost-Effective, High-Performance Backup Networks," 8 pages.

Geekmail, Inc. (2003). "Geekmail—IMAP, Anti-Spam Email Hosting," located at <http://web.archive.org/web/20040401200823/www.geekmail.com/home/>, last visited on Dec. 7, 2005, 3 pages.

Kozierok, C.M. (Sep. 20, 2005). "The TCP/IP Guide," located at <http://www.tcpipguide.com/free/index.htm>, last visited on Dec. 6, 2005, 3 pages.

Mailgov. (Date Unknown). "Product Features," located at <http://web.archive.org/web/20040607035920/http://mailgov.com/product_features.php>, last visited on Dec. 7, 2005, 1 page.

Motorola, Inc. (May 7, 2003). "Managed Services Solutions for Federal Government Agencies," located at <http://www.motorola.com/governmentandenterprise/contentdir/en_US/Files/SolutionInformation/FEDWhitePaperOverview.pdf>, last visited on Dec. 12, 2005, 8 pages.

Neon Software, Inc. (1993-2002). "LANSurveyor® Version 7 User's Manual," 244 pages.

Notable Solutions, Inc. (Date Unknown). "Methods of Routing Documents with AutoStore," 2 pages.

Oracle. (2005). "Oracle9i Lite: Data Sheet," located at <http://www.oracle.com/technology/products/lite/htdocs/o9ilite_datasheet/htm>, last visited on Dec. 6, 2005, 5 pages.

Oracle. (Mar. 2002). "Oracle9i: Recovery Manager Reference," 292 pages.

PeopleCube. (2005). "Meeting Maker Features & Benefits," located at <http://www.meetingmaker.com/products/meetingmaker/features_benefits.cfm>, last visited on Dec. 7, 2005, 3 pages.

Schuba, C. et al. (May 2005). "Integrated Network Service Processing Using Programmable Network Devices," Sun Microsystems, Inc. Technical Report, 30 pages.

VocalTec Communications Ltd. (Jul. 2004). "EssentraTM Product Suite: General Description," 16 pages.

Wildgate WirelessTM. (Date Unknown). "How Cool Can Email Get?," located at <http://www.wildgate.com/Register_Pages.Email.htm>, last visited on Dec. 7, 2005, 1 page.

Yau, D. et al. (Date Unknown). "Extensible Network Security Services on Software Programmable Router OS," 25 pages.
Youngtech, Inc. (Date Unknown). "Disaster Recovery," located at <http://www.youngtech.com/documents/DisasterRecovery.pdf>, last visited Dec. 6, 2005, 2 pages.
Office Action in U.S. Appl. No. 11/462,242, mailed on Oct. 20, 2010.
Office Action in U.S. Appl. No. 11/462,242, mailed on Oct. 13, 2009.
Office Action in U.S. Appl. No. 11/462,242, mailed on Apr. 17, 2009.
Office Action in U.S. Appl. No. 11/462,242, mailed on Nov. 12, 2008.
Office Action in U.S. Appl. No. 11/462,242, mailed on Aug. 5, 2008.
Coulouris, G. et al. (1994). *Distributed Systems: Concepts and Design*. Second Edition, Addison-Wesley Publishing Company, pp. 222-233, 311-318.

International Search Report mailed Jul. 11, 2003, for PCT Application No. PCT/US03/07180 filed Mar. 11, 2003, 1 page.
International Search Report mailed Jun. 23, 2003, for PCT Application No. PCT/US03/07179 filed Mar. 11, 2003, 1 page.
International Search Report mailed Oct. 1, 2003, for PCT Application No. PCT/US03/07182 filed Mar. 11, 2003, 2 pages.
International Search Report mailed Oct. 18, 2004, for PCT Application No. PCT/US04/02033 filed Jan. 21, 2004, 1 page.
International Search Report mailed Oct. 8, 2003, for PCT Application No. PCT/US03/07181 filed Mar. 11, 2003, 1 page.
U.S. Appl. No. 11/796,258, filed Apr. 27, 2007 for Yang et al.

* cited by examiner

DATA SYNCHRONIZATION AND DEVICE HANDLING

RELATED APPLICATIONS

This application is related to U.S. patent application Ser. No. 11/182,287, filed Jul. 14, 2005, entitled CONTENT ROUTER, to Torsten SCHULZ et al., and Ser. No. 11/264,121, filed Oct. 31, 2005, entitled CONTENT ROUTER PROCESSING, to B. Ebbessen et al., both of which are hereby incorporated by reference in their entirety as if fully set forth herein.

BACKGROUND

1. Field

The present invention relates generally to data synchronization between two or more devices, and in one aspect, to a synchronization method and system to reduce the potential for synchronization failures.

2. Description of Related Art

A variety of mobile computing devices exist, such as personal digital assistants (PDAs), mobile phones, smart phones, camera phones, pocket personal computers, and the like which perform an ever growing variety of functions. The trend is for mobile computing devices to have increased functionality such that a single mobile device may, for example, provide Internet access, maintain a personal calendar, provide mobile telephony, take digital photographs, play music files, and the like.

Data on such mobile computing device can be synchronized with network applications, desktop computer applications, or other databases within a telecommunications system. For example, calendar entries, contact information, and email applications, in particular, may be synchronized between multiple devices via a communication system. The SyncML (Synchronization Markup Language), which is based on the XML (extensible Markup Language) is well known for the synchronization of data between two or more devices, e.g., a client device and a server device. The SyncML synchronization protocol using messages in the SyncML format (SyncML messages) generally allows for synchronization of data in any application between any networked terminals. For example, a calendar entry in a user device is synchronized with a network calendar.

Figure 1:
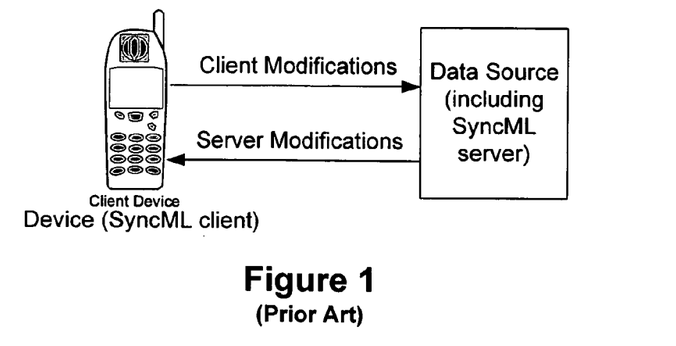
FIG. 1 illustrates a prior art system and method for synchronizing a client device and a server device.

FIG. 1 illustrates an example of system where a client device, e.g., a cell phone or other mobile device, functions as a SyncML client terminal and a data source, e.g., a computer or network server computer, functions as the SyncML server. SyncML client terminal synchronization application layer functions are provided by a synchronization client agent, which implements the SyncML protocol by sending a SyncML package (e.g., Client Modifications), which includes, in one or more SyncML messages, modifications made after the last synchronization session to the data that is the object of synchronization in the mobile device. SyncML/data source server synchronization application layer functions are provided by a sync server agent, which controls synchronization. The server usually waits for an initiative for synchronization from the SyncML client. The server synchronizes the data by analyzing the changes made to the database and client terminal data, and synchronizes the data (i.e., makes necessary modifications, replacements, and deletions). After this, the SyncML server sends the server modifications back to the SyncML client.

As described, for example, in "SyncML Sync Protocol, version 1.1.1" dated Oct. 2, 2002, (which is put forth by the Open Mobile Alliance ("OMA") and provided at "http://www.openmobilealliance.org", and for which the entire content is incorporated by reference herein), the SyncML synchronization protocol operates in both wireless and wired networks and supports several transfer protocols. The SyncML synchronization protocol can be implemented, for example, on top of HTTP protocol (Hyper Text Transfer Protocol), WSP protocol (Wireless Session Protocol) of the WAP (Wireless Application Protocol) standard, OBEX (Object EXchange Protocol) protocol used for cable links, such as the USB (Universal Serial Bus) or RS-232, or for short-range radio frequency (Bluetooth) links or infrared (IrDA) links, on top of a TCP/IP (Transport Control Protocol/Internet Protocol) stack, and also on top of an e-mail protocol (SMTP, Simple Mail Transfer Protocol). There are typically several different transmission media between the devices (client and server) of a SyncML session, for instance a GSM network providing a wireless connection, and a local area network LAN. Also many transport layer protocols may be used to transfer SyncML messages. Different transmission media and the devices involved in the SyncML session may have different properties, e.g., varying data rates and packet sizes. The SyncML includes end-to-end transmission of SyncML messages and functions even though a plurality of transport layer protocols are used.

Often a SyncML session needs a relatively long (e.g., several seconds to minutes or more) and continuous connection to complete a synchronization process, which generally includes synchronizing the client and server databases. If the connection is lost during the SyncML session, the client may need to perform a synchronization of all data (not just modifications) to ensure the datasets are synchronized. The synchronization of all data (sometimes referred to as a "slow sync"), may take an extended period of time leading to expensive data transfers and user dissatisfaction with the process. Accordingly, it is desired to provide improved systems and methods for synchronizing devices to avoid or reduce slow synchronization processes and further to perform slow synchronizations more quickly.

SUMMARY

According to one aspect provided herein, a synchronization server is provided for synchronizing client devices. In one example, the synchronization server comprises logic operable to engage in a first synchronization session with a client device, wherein client modifications and server modifications may be exchanged. The server modifications are based, at least in part, on synchronization data stored locally. The synchronization server further includes logic operable to initiate a query of a remote database (e.g., having data associated with the synchronization data) to determine differences between the synchronization data stored locally and associated data stored remotely. The synchronization server is further operable to initiate an exchange of further server modifications based on the differences between the synchronization data stored locally and the associated data stored remotely.

In some examples, a synchronization server further includes logic operable to engage in a second synchronization session with the client device to exchange the further server modifications. The server may further notify the client device of the further server modifications after the first synchronization session (e.g., if differences are determined). Additionally, the synchronization server may include logic operable to initiate a slow synchronization ("slow sync") process with the client device. In one example, the slow sync includes comparing Locally Unique Identifiers and Cyclical Redundancy Checks of data associated with the client device (as opposed to comparing data on a field-by-field basis). The remote database may include various servers and backends including user accounts and Personal Information Management applications (e.g., Contacts, Calendar, and the like).

In another example, the synchronization server may further comprise logic operable to modulate the synchronization data based on the client device. For example, the data may be modulated for the capabilities, desired performance, etc., of the client device. The synchronization server may further generate and store information associated with the synchronization data that is operable to determine subsequent changes to the synchronization data. For example, various algorithms may be used to generate values, such as CRC values, hash values, or the like and used to determine modifications to data by a user. Further, data may be stored to return modulated synchronization data back to its original form.

In another aspect and example, a synchronization server may include a slow synchronization process to potentially provide a slow synchronization process more efficiently than conventional processes. In one example, the slow synchronization process attempts to avoid a full field-by-field analysis, which may reduce the time and expense over conventional slow synchronization processes. Additionally, in one example, the slow synchronization process is based on local inventory (e.g., stored locally with the Sync server, as opposed to a remote database and backend).

According to another aspect and example, a method for synchronizing a device and a remote database are provided. In one example, the method includes engaging in a first synchronization session with a client device, wherein client modifications and server modifications may be exchanged, the server modifications based, at least in part, on synchronization data stored locally. Further, the method includes querying a remote database to determine differences between the synchronization data stored locally and associated data stored remotely, and may engage in a second synchronization session with the client device to update the client device with differences to the synchronization data stored locally and the remote database.

According to another aspect and example, a computer program product comprising program code associated with synchronizing devices is provided. In one example, the computer program product includes program code operable to engage in a first synchronization session with a client device, wherein client modifications and server modifications may be exchanged, the server modifications based, at least in part, on synchronization data stored locally; program code operable to initiate a query of a remote database to determine differences between the synchronization data stored locally and associated data stored remotely; and program code operable to engage in a second synchronization session with the client device to update the client device with differences to the synchronization data stored locally and the remote database.

The present invention and its various aspects are better understood upon consideration of the detailed description below in conjunction with the accompanying drawings and claims.

DETAILED DESCRIPTION

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

Some examples described herein provide systems and methods for synchronizing devices in a manner which may reduce or avoid synchronization delays, failures, and "slow" synchronization processes common with conventional synchronization systems. In one example, a synchronization system includes a synchronization server (referred to herein as a "Sync server") that replies to a client during a first synchronization session initially with information readily available with the Sync server (e.g., in local memory of the Sync server).

The Sync server may query a remote database associated with the client device for information associated with the first synchronization session and determine if the information sent during the first synchronization session (e.g., the information in local memory of the Sync server) varies from the database information. If the information varies, the Sync server sends further server modifications to update and synchronize the client device. If the first synchronization session is no longer open, the Sync server may initiate a second synchronization session with the client device to send the server modifications. In one example, the server may initiate or notify the client to initiate a second synchronization session, for example, by an SMS (e.g., a plain text, binary, WAP Push SMS, or the like). In other examples, the client will attempt to synchronize with the server one or more times after the first session to poll for further server modifications.

In one example, if there are no changes in the database, the Sync server may send one or more empty syncs (also known as "keep alives"), which generally allow the synchronization session to be extended without extending the Sync server response time to each client request. The time between empty syncs and the number of empty syncs may be configured for various considerations. In one example, the empty syncs are kept to a minimum to reduce the length of the synchronization session and reduce the possibility of network communication failures.

The exemplary systems may reduce the time of the synchronization sessions and reduce the chance for session failures and the resulting need for conventional slow syncs, for example. In addition to possible improved device performance, the exemplary methods and systems may also increase the server responsiveness because the server does not have to hold connections during synchronization session for as long as conventional methods and systems.

Figure 2:
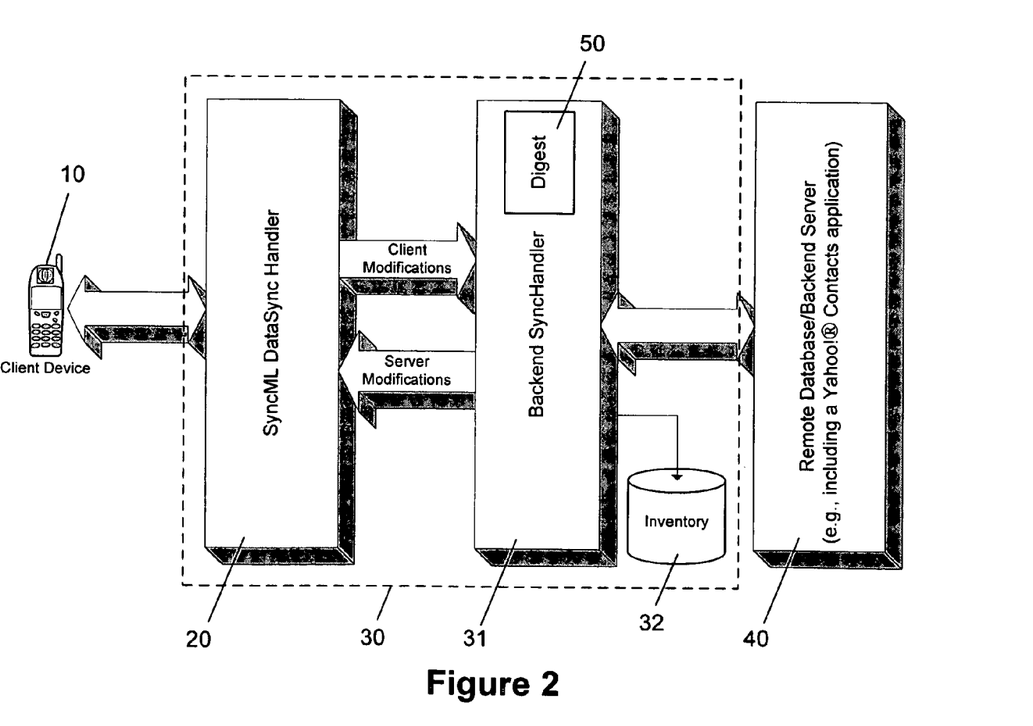
FIG. 2 illustrates a basic architecture in which various aspects described herein may operate.

FIG. 2 illustrates an overview of an exemplary architecture in which some aspects of the present invention are utilized. Broadly speaking, a client device 10 communicates with a Sync server 30, in this example, including a Sync handler 20 (shown as a "SyncML DataSync Handler"), a Backend Sync Handler 31, a local database or inventory 32, and a digest 50, all of which are operable to perform various synchronization processes. Various components of Sync server 30 may include servers, databases, and other well known components. It is noted that the examples described here are shown and described generally for SyncML protocol (based generally on XML-schema) for illustrative purposes only; various other protocols are possible and contemplated.

Client device 10 may communicate with Sync server 30 via a wireless network, such as a wireless gateway, e.g., a cellular, satellite, or other wireless network. Additionally, client device 10 may communicate via a non-wireless network such as a cable or fiber optic network, or a combination of wireless and non-wireless systems.

Client device 10 may include various devices including, for example, mobile devices such as a PDA, mobile telephone, smart phone, pager, walkie talkie, radio frequency (RF) device, infrared (IR) device, Wi-Fi device, pocket personal computer, tablet personal computer, laptop computer, and integrated devices combining one or more of the preceding devices, as well as a desktop computer, or the like. Client device 10 may include a processor connected to an input device such as a keyboard, a network interface, a memory, and a display. The memory may include logic or software operable with client device 10 to perform some of the functions described herein. Client device 10 may be operable to include a suitable interface for a messaging facility, such as an email inbox, instant messaging (IM), short messaging service (SMS), multimedia messaging service (MMS), and the like. Device 10 may further be operable to display a web browser for accessing the Internet, including webmail environments such as a Yahoo!® mail account or Hotmail® account, for example.

In one example, client device 10 communicates with Sync server 30 via Sync handler 20 such that client device 10 and Sync server 30 may exchange data (e.g., through a synchronization session to exchange client and/or server modifications to data). Through this communication, client device 10 is capable of synchronizing with synchronization data stored with Sync server 30. By way of example only, client device 10 and Sync server 30 may use the wireless application protocol (WAP) or other data communication protocol of client device 10 to communicate. One of ordinary skill in the art will recognize that the Wireless Application Protocol (WAP) is only one way in which a wireless device can access data on a network and that any such data transfer technology may be used to access and transfer electronic data. Further, the methods and systems described here are not limited to wireless communication methods and/or devices. For example, client device 10 may be wired directly to Sync server 30 (which may include a PC, for example).

Sync server 30 is further operable to communicate with at least one remote database or backend server 40. Remote database 40 includes, e.g., data associated with the local synchronization data on Sync server 30, data associated with client 10, and the like. In one example, the remote server 40 includes a user account such as a Yahoo!® user account, MSN® user account, or the like. Additionally, the remote server 40 may include one or more Personal Information Management (PIM) applications, such as Contacts, Calendar, or the like.

In one example, inventory 32 generally stores information such as CRCs, hash values, LUIDs, and the like for use when synchronizing client device 10 and may allow for the analysis of client modifications without accessing the remote database 40. As described more fully below, Sync server 30 may initially respond to and synchronize client device 10 with data stored locally, e.g., with inventory 32. Further, data routed between client device 10 and remote database 40 may need to be modulated or transformed for use by client device 10. Accordingly, Sync server 30 includes a digest 50 to store data associated with such modifications of data to assist in preserving the integrity of data as it flows to and from client device 10.

It should be noted that although the exemplary methods and systems described herein describe use of separate servers and databases for performing the various functions, other embodiments could be implemented by storing the software or programming that operates some of the described functions on a single server or any combination of multiple servers as a matter of design choice so long as the functionality described herein is performed. Although not depicted in the figures, components, such as Sync server 30, generally include such art recognized components as are ordinarily found in server systems, including but not limited to processors, RAM, ROM, clocks, hardware drivers, associated storage, and the like.

Figure 3:
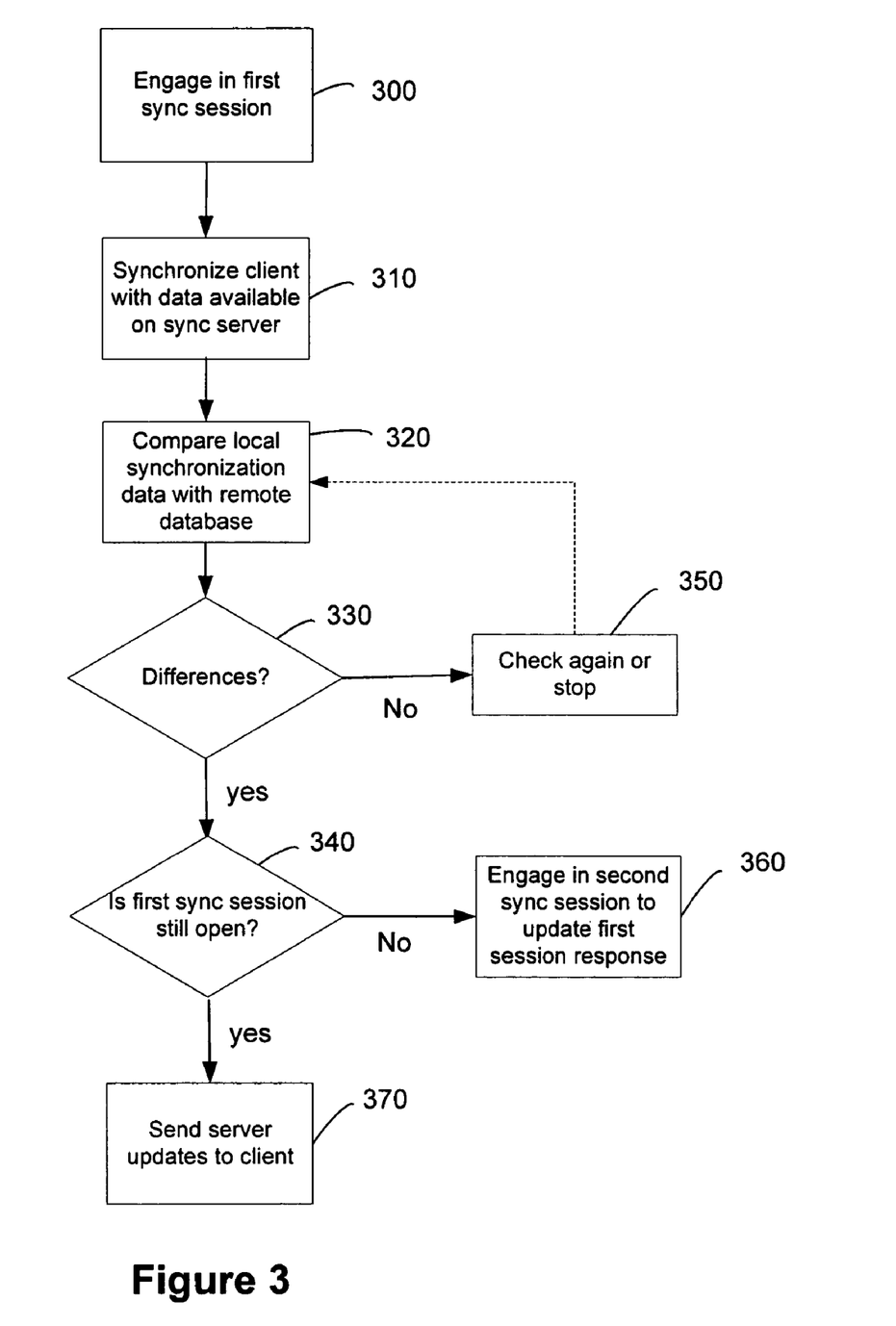
FIG. 3 illustrates an exemplary method for a synchronization process between a client device and synchronization server.

FIG. 3 illustrates an exemplary method for a synchronization between a client and server according to one aspect provided, which may be referenced in combination with FIG. 2 (e.g., with reference to client device 10, Sync server 30, etc.). In particular, a first synchronization session is initiated between a client device and a Sync server as indicated in block 300. In one example, the client device initiates the synchronization session, but in other examples the Sync server may initiate the synchronization session. Once the first synchronization session is established the client and server may exchange modifications (e.g., client and server modifications) and are synchronized in block 310. The synchronization is initially based on the local synchronization data available with the Sync server (e.g., in local memory such as inventory 32 of the Sync server 30). This allows a relatively short synchronization session (in comparison to conventional systems which hold the first synchronization session while querying a remote database). The short synchronization session may reduce the potential for synchronization errors that may lead to a slow synchronization process with the Sync server.

After the client device and Sync server are synchronized based on the local synchronization data available, the Sync server queries the remote database in block 320 to compare and determine if the local synchronization data is accurate (e.g., was client 10 synchronized with accurate, current data). The remote database may include a backend or server associated with a user account, such as a Yahoo!® account, MSN® account, or the like and including one or more PIM applications. In one example, the backend includes a server and/or router as described in co-pending U.S. patent application Ser. Nos. 11/182,287, filed Jul. 14, 2005 and 11/264,121, filed Oct. 31, 2005, the entire contents of which are hereby incorporated by reference.

The Sync server communicates with the server to determine if the local synchronization data is accurate or there are differences between the local synchronization data and the remote data in block 330. The difference, if any, can be determined by the Sync server or the remote database. If there are no changes, the process can cease or recheck the data for changes at a later time (e.g., after a preset time) in block 350.

If there are changes or differences in the local synchronization database and the remote database, the Sync server will update the client device with further server modifications. Accordingly, it is determined if the first synchronization session is still open at block 340. If the session is no longer open, the client device and the Sync server may engage in a second synchronization session in block 360, whereby the additional server modifications are synchronized to the client device. If the first synchronization session is still open, the server modifications are sent to the client device in block 370.

Figure 4:
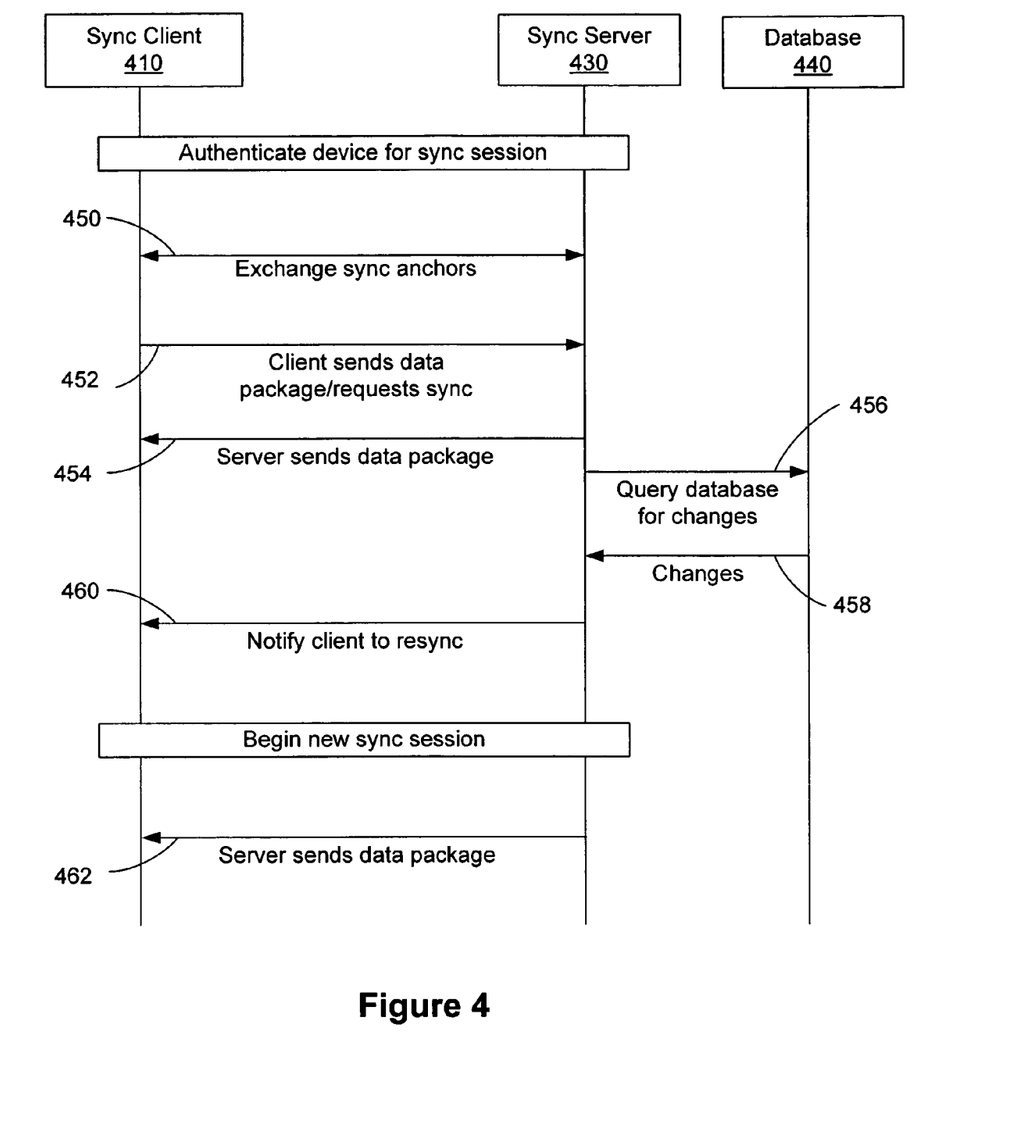
FIG. 4 schematically illustrates an exemplary signaling chart illustrating signaling events for data synchronization according to one example.

FIG. 4 schematically illustrates an exemplary signaling chart showing various signaling events according to another example. In this example, a synchronizing process is shown between a Sync client 410 and a database 440 through Sync server 430. The example of FIG. 4 is similar to the method described with respect to FIG. 3. Sync client 410 is shown communicating directly with Sync server 430, however, it is understood that a Sync data handler such as a SyncML DataSync Handler or the like may be interposed between Sync client 410 and Sync server 430 (similar to the example shown in FIG. 2).

Initially, the Sync client 410 is authenticated for a synchronization session with Sync server 430. The authentication process may include any suitable process known in the art. Typically, synchronization anchors ("sync anchors") are then exchanged as indicated by 450.

Thereafter, Sync client 410 sends a data package 452 including a request for synchronization. The data package 452 may also include data associated with client modifications, a portion of, or the entire client database associated with Sync client 410. The Sync server 430 responds with a data package 454 to Sync client 410. The data package 454 may include server modifications based on an analysis of the data package 452 received and a comparison of client data to a locally stored database of synchronization data associated with Sync client 410.

Sync server 430 queries remote database 440 (which may include various backends, servers, etc.) at 456 for changes (for which the first synchronization session does not need to be held). Sync server 430 compares the locally stored synchronization data with that stored remotely with database 440 for any changes or differences therebetween (such changes may flow back to Sync server 430 as schematically indicated by arrow 458).

If there are differences or changes between the synchronization data stored locally with Sync server 430 and that of database 440, Sync server 430 notifies Sync client 410 via notification 460. Notification 460 may include any suitable notification method(s) such as an SMS or the like. Alternatively, Sync client 410 may be configured or operable to sync back with Sync server 430 after a preset time (e.g., several seconds, minutes, hours, or even days) to query for additional server modifications. Whether initiated by Sync client 410 or Sync server 430, Sync client 410 and sync server 430 begin a new or second synchronization session whereby the changes are updated according to change 458 via data package 462.

Figure 5:
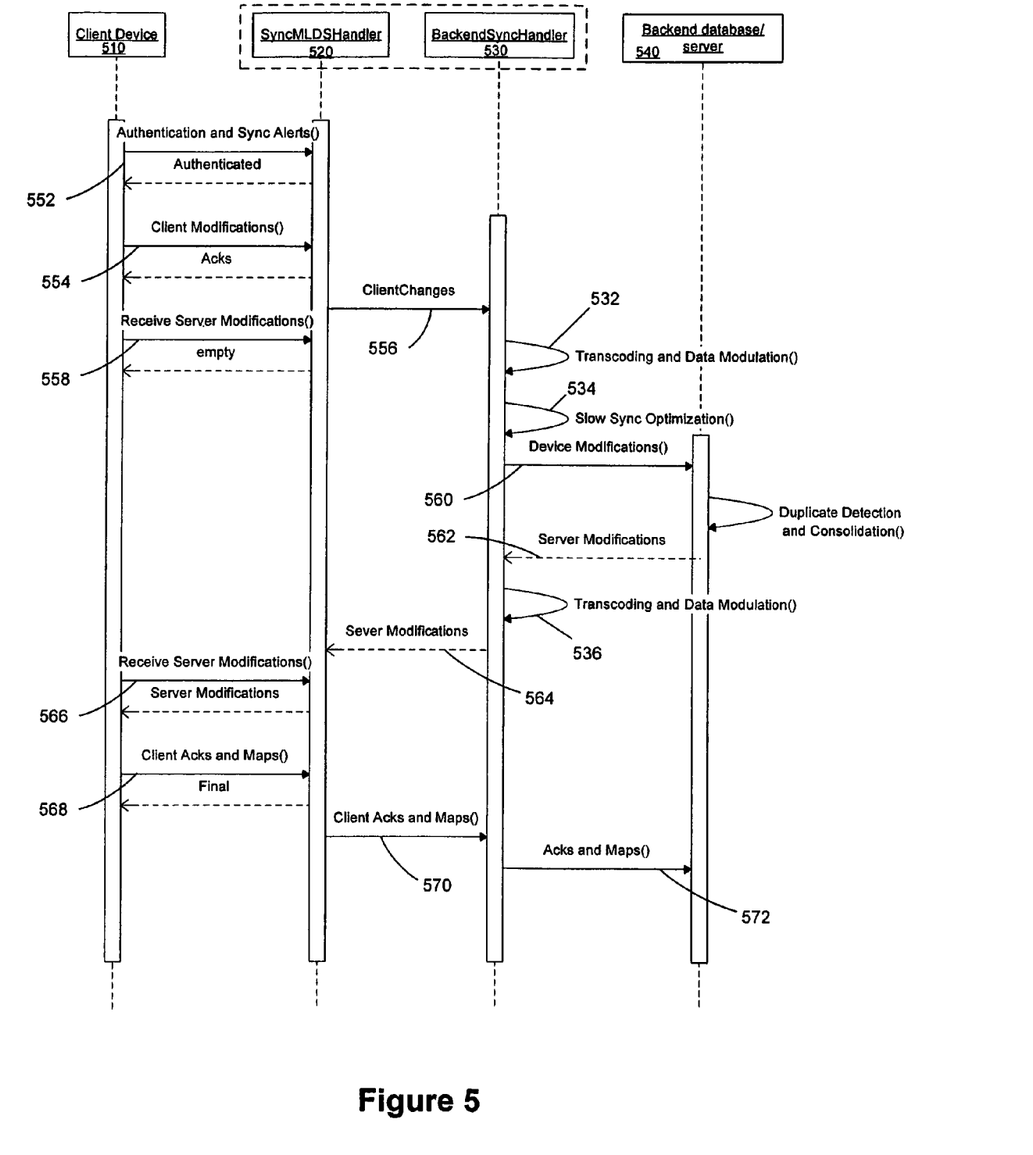
FIG. 5 schematically illustrates an exemplary signaling chart illustrating signaling events for data synchronization according to another example, including a slow synchronization optimization process.

According to another aspect of the present invention, a slow Sync optimization method is provided and illustrated in FIG. 5. In particular, FIG. 5 illustrates a data flow and signaling chart showing events for a slow synchronization process according to another example, including a slow sync optimization method. The exemplary slow sync optimization may be used in combination with the exemplary systems and methods described with regard to FIGS. 2-4.

Initially, client device 510 begins a session with Sync handler 520 at 552 (e.g., authentication processes, exchanging sync anchors, and the like). Client modifications are forwarded to Sync handler 520 at 554 (and an acknowledgement may be returned). The client modifications are then forwarded to the Sync server 530 at 556. At 558 the client device 510 is querying Sync server 530 for any modifications, in this example, receiving an empty sync.

The Sync server 530 may perform various transcoding and data modulation processes 532 on the client changes and client data received via 556. For example, various processes may be carried out to modify content and/or changes to content received from the remote database 540 such that the content may be received by or suited for client device 510. An illustrative example includes modifying a Contact entry from a Yahoo! Contacts backend such that a less capable client device (e.g., a mobile phone, which might store only a name and phone number) may receive and use information related to the contact. Additionally, various other data preservation processes may be carried out by the Sync server 530 to assist in data integrity (as will be described in further detail below).

Additionally, a slow sync optimization process 534 may be performed by the Sync server 530. As previously described, a conventional SyncML slow Sync is generally a process whereby the client device sends all data in its database to the sync server and the server performs an analysis of the client data and the data in server database on a field-by-field basis. After the analysis, the Sync server returns all needed modifications to the client device so that the client device is synchronized.

The exemplary slow sync optimization process 534 attempts to avoid the relatively expensive field-by-field slow sync analysis by performing a slow sync process based on pending server modifications, and a small inventory of Locally Unique Identifiers (LUIDs) and corresponding Cyclical Redundancy Checks (CRCs). In particular, in one example, the input from the client device 510 to the Sync server 530 includes the data in the client database, pending server modifications that were sent to the device but for which the Sync server did not receive client acknowledgments ("acks"), and an inventory of LUIDs and CRCs for each item (e.g., an entry in a PIM application, such as a contact entry or calendar event entry) that the server determines is in the client database as of the last successful synchronization session. In other examples, various other identifiers and data values, such as hash values or the like may be used.

For each item in the client database, the Sync server 530 calculates a CRC. If the LUID is found in the client inventory, and the CRC matches the inventory CRC, the item is determined to have not changed since the last successful synchronization session. If the client LUID is found in the inventory but the CRC does not match, the item is determined to have been modified by the client device.

If the client LUID matches one of the pending server modifications, and the client CRC matches the server modification CRC, the server modification has been updated on the client device already (e.g., in the last synchronization session). If the client CRC does not match the server modification CRC, the Sync server generally is unable to determine whether the item has been modified by the server only or by both the client and the server. In such an instance, a duplicate and consolidation process of this item may be performed.

If the LUID is not found in the inventory, and the CRC matches one of the pending server ADDs, the server ADD has been previously received on the client device 510. The server items are then mapped to the LUID. If the LUID is not found in the inventory, and the CRC does not match any pending server ADD CRC, this is determined to be a new item created from the client device 510.

For all pending server DELETEs, if the LUID is in the client database, the delete is sent to the client device 510. If the LUID is not in the client database, the item is determined to have been deleted from the client device 510 previously. For all LUIDs in the inventory but not in the client database, the items have been deleted from the client device 510 and are deleted from the server 530.

After the slow sync optimization process, the device modifications are sent from the Sync server 530 to the backend/server 540 at 560. The server modifications are then sent from the backend/server 540 to the Sync server 530 at 562. Sync server 530 may perform further transcoding and data modulation processes 536 (e.g., based on the client device 510). Server modifications 564 are then forwarded to the Sync handler 520 (in a first or second synchronization process as described with respect to FIG. 4), where they may be received via 566 by client device 510. The client device 510 may acknowledge and map the changes at 568. The map process may include well known operations of forwarding the LUID of the new item, which will be updated by the Sync handler 520 mapping table to include the client LUID. Acknowledgements and maps may then propagate to Sync server 530 and remote database 540 via 570 and 572 respectively.

Various other features and functions may be used in combination with the above described slow sync process. For example, various other features may be included in combination; additionally, some features may be modified or omitted. Those of ordinary skill in the art will recognize that this example is illustrative only of one example of performing a slow sync method as described herein.

Typically, a Sync server, such as Sync server 30 described with reference to FIG. 1, is operable with various client devices, e.g., with various mobile phones or the like of various manufactures and running various software platforms. Further, client devices are generally not adapted for receiving software for compatibility with a Sync server. Accordingly, a sync server may include logic operable to modulate or transform data as data is routed through the Sync server to client devices in an effort to preserve data.

Exemplary Sync server data preservation methods and systems described here generally protect the user's data from the corruption or loss of data on the client device in the case where the user did not actually modify the data. For example, for many client devices, the data will be transformed prior to delivery to the client device. A copy of the data sent to the device is modified as the device would and transformed with a CRC, hash, or similar function to provide a key in a digest (see, e.g., digest 50 shown in FIG. 1) where the metadata and/or data for reversing the device changes is stored. If the key is found when the device sends the data back to the server, the missing data is restored; otherwise the data is forwarded "as is", e.g., generally indicating that a user change has occurred to the data. In one example, if data may be restored algorithmically, a digest entry is not needed. In one example, the digest information is stored by an IMEI (International Mobile Equipment Identity) number or other suitable identification number in the Sync server. Individual entries in the digest are further identified by the data's LUID.

For example, with reference to FIG. 1, Sync server 30 includes digest 50, which includes logic operable to store keys and to work with a variety of disparate client devices to modulate data as it flows through the sync server and between particular client devices and remote databases. In one example, the logic includes a JAVA® plug-in to work with the Sync server, but other implementations are possible and contemplated.

A content entry from the remote database may include more information, or a format of information, that can not be easily accepted or handled by the client device. Additionally, as data is sent back from a client device, the data may be modulated by the device causing confusion as to whether changes were caused by the client device or the user of the client device. Accordingly, the logic may modulate the content entry, e.g., modify or delete one or more data fields or the like, before or as the data is sent to the client device. When the sync server receives client modifications, the sync server determines which data changes were made by the user and which data changes were made to "fit" the client device, e.g., based on device characteristics. The digest is included with the Sync server such that the Sync server does not have to query the remote database or the like to determine the specific data changes by the user versus by the device characteristics.

In one example, the digest stores the data and metadata and various algorithms stored with the Sync server operate on the data and metadata to determine CRCs, hash values, or the like. The algorithms and resulting information may be used to determine if data has been changed by the user or client device. For example, a CRC may be determined for each content entry sent to the client device; if the CRC of a content entry from the device does not match the stored CRC, the digest may determine that the data has been changed.

The digest may further store some limited shadowed content of data sent to the client device. For example, if a data structure from the remote database destined for a particular client device includes a first name string and a second name string, but the client device is only able to handle a single-string name, the Sync server may replace the two string structure with a single string structure containing a concatenated first and last name in the single string structure. The structure including the first name string and the second name string may be stored in the digest for later use, e.g., if the data is later sent (either in a modified or unmodified form) from the client device the Sync server may replace the concatenated string with the copy of the two string structure from the digest (subject to any user modifications). In this way, missing or modified content from the client device may be restored and thus preserved.

For a particular group of client devices, such as a client device manufacture or manufacture model, etc., the device capabilities may be determined. For example, the length of a name field, format of a name field or phone number field, and the like, may be determined as well as how such data fields are handled by the device. Suitable algorithms and program code may then be used with the Sync server to modulate or transform data as it is sent to particular devices. Thus, as data flows from the remote database to the client device, the data is modified for the particular client device. Further, as data flows from the client device to the remote database, the data is restored to its original state (but including any changes determined to be user changes) so that the client device can be synchronized with the remote database. Modulating the data within the Sync server may free the Sync server from waiting on the remote database/backend for some of the routing and determinations of changes to data.

Several illustrative examples of data preservation are described for exemplary applications such as Contacts, Events, and the like. In a first example, the data preservation logic and methods may be used to preserve a contact name field for a contact entry. As an example, as data is routed from a remote database or data source to a client device via the Sync Server, the Sync server will generate a key by concatenating first, last, and company names in the character set. Encoding the device will return, truncating at the device limit and performing a CRC, hash or similar function on this data. The generated key will be used to store or index the number of words in each name and any truncated portion in the digest.

Further, as data is routed from the client device, the Sync server will concatenate first and last names and generate a CRC, hash, or similar value (depending on how the data was treated from the Sync server to the client device). The Sync server checks if the particular key exists in the digest. If the key does not exist, the Sync server passes along the first and last name as the device presented them. If the key does exist, the Sync server uses the stored data to return the words and any truncated portion to first name, last name or company name.

In a second example, the data preservation logic and methods may be used to preserve a contact postal address field for a contact entry. As an example, as data is routed from a remote database or data source, the Sync server will generate a CRC of the entire address data as it will be coming back from the device as a key. The generated key is used to store the type of postal address and keep a CRC for each address field. As data is routed from the client device, the Sync server will generate a CRC, hash value, or similar value from the address data for the key to the digest. If the key does not exist in the digest, the Sync server will assign each line to a field in the order of street, city, state, zip, country (for example). If the key exists in the digest, the Sync server makes a CRC, hash value, or similar value from each line and matches it against the digest values to determine the field for the data. The postal address type may then be restored (e.g., home, work, or other).

In a third example, the data preservation logic and methods may be used to preserve a contact phone number field for a Contact entry. As an example, as data is routed from a remote database or data source, the Sync server will transform a copy of the phone number into a version the device will accept and send back during subsequent synchronization sessions. The Sync server may then generate a CRC, hash value, or similar value from the transformed phone number to create a key for the digest. Any data removed or transformed is stored with a count of the characters to be restored from the device where they occurred in the data source version, the type of the number from the data source, and the like. Additionally, the Sync server may map the data source type to an appropriate device number type and store this information as well.

Further, as data is routed from the client device, the Sync server will create a CRC, hash value, or similar value as a key to the digest. If the key does not exist, the data will be routed "as is", e.g., without any modulation. If the key exists, the Sync server will restore the phone numbers according to the data in the digest and verify if the type of the phone number has changed (e.g., a user change). If a user change has occurred, the Sync server will map to an appropriate data source type. If no change, the Sync server will restore the data source type from the digest.

In a fourth example, the data preservation logic and methods may be used to preserve an event alarm field for an Event entry. As an example, as data is routed from a client device to the remote data base, the Sync server will store a flag in the digest if there is an audio alarm or a display alarm. As data is routed from the client device, the Sync server will check the digest to determine if the data had a display or audio alarm associated therewith and restore each one that existed. If there was no previous alarm on the device, the Sync server will pass through any audio or display alarms.

In a fifth example, the data preservation logic and methods may be used during an initial import of information (for example, when a client device is initially synchronized with a Sync server and the data first enters the synchronization community). In this instance there is generally no digest information for the data as the data is new to the Sync server. Another example having no digest information includes data or a file that has been corrupted because of a hardware issue such as disk full or the like. The data is handled by the Sync server similarly to data that a user made changes to, and information missing from the content may be added algorithmically and routed to the remote database for processing and the like. Adding information algorithmically may be illustrated by a postal addresses in a contact entry where there is no data matching the contact in the remote database. The client device my lack a type of postal address, e.g., such as "work", "home", or "other". The remote database, which my include a more sophisticated Contact application, may have a type field for the address. Thus, the Sync server may include an algorithm for assigning the types in a predefined order.

In a sixth example, the data preservation logic and methods may be used in an instance where data may be lost based on the particulars of the client device. An illustrative example of this aspect includes an attempt to send a contact entry having more phone numbers than a client device will support. In such an instance where data may be lost by the data modulation and data preservation of the Sync server, the Sync server may block syncing the particular data with the client and send an alert to the remote database, and in one instance, a data router associated with the remote database.

In a seventh example, the data preservation logic and methods may be used to prevent unintended user modifications to the information stored with the remote database. For example, a user may delete all contacts on a client device through a device reset, restore factory settings, "delete all" menu item, or the like. The client device will send DELETEs as the client modifications to the Sync server, however, the user may not have intended to delete all contact data from the remote database. In another example, the user may synchronize the same client device with a different or secondary Sync system and remote database having different client data associated therewith such that when synchronizing with the Sync system unexpected client changes will be made.

Accordingly, in this example, the data preservation logic may include initial refresh rules, which may be based on a threshold number and/or percentage of the client modifications. For example, if the thresholds have been exceeded, the client modifications are not sent to the remote database. Instead, a slow sync with the client is requested and all the client data (if not deleted) are imported for a full duplicate detection and consolidation process. Data in the remote database may then be restored back to the client device without the loss of data.

These examples are illustrative only of data perseveration logic and methods for routing data to and from client devices. It will be obvious that various other methods may be used depending on the particular application, content type, and the like.

Although the present invention has been described in connection with various examples and aspects, it is not intended to be limited to the specific form set forth herein. Rather, the scope of the present invention is limited only by the claims. Additionally, although a feature may appear to be described in connection with a particular example or aspect, one skilled in the art would recognize that various features of the described examples and aspects may be combined in accordance with the invention. Moreover, aspects of the invention described in connection with an example or aspect may stand alone as an invention.

Moreover, particular examples have been discussed and how these examples are thought to address certain disadvantages in related art. This discussion is not meant, however, to restrict the various examples to methods and/or systems that actually address or solve the disadvantages.

What is claimed is:

1. A synchronization server comprising:
a data storage;
a processor for:
engaging in a first synchronization session between a client device and the synchronization server, wherein client modifications and synchronization server modifications are exchanged, the synchronization server modifications based, at least in part, on synchronization data stored locally on the data storage of the synchronization server;
determining, by the synchronization server, the client modifications based, at least in part, on a digest indicating which client modifications are changes by a user of the client device and which client modifications are changes due to characteristics of the client device;
in response to the first synchronization session, initiating a query of a remote database on a backend server from the synchronization server to determine differences between the synchronization data stored locally on the synchronization server related to the client device and associated data stored remotely on the remote database; and
initiating an exchange of further synchronization server modifications to the client device based on the differences between the synchronization data stored locally on the synchronization server and the associated data stored remotely on the remote database.

2. The synchronization server of claim 1, wherein the processor further engages in a second synchronization session with the client device to exchange the further synchronization server modifications.

3. The synchronization server of claim 2, wherein engaging in a second synchronization session comprises responding to a request from the client device.

4. The synchronization server of claim 1, wherein the processor further notifies the client device of updates for the client device after the first synchronization session.

5. The synchronization server of claim 1, wherein the processor further initiates a slow synchronization process with the client device.

6. The synchronization server of claim 5, wherein the slow synchronization process comprises comparing Locally Unique Identifiers and Cyclical Redundancy Checks of data items.

7. The synchronization server of claim 1, wherein the processor further modulates synchronization data based on the client device.

8. The synchronization server of claim 7, wherein the modulation of data is based on capabilities of the client device.

9. The synchronization server of claim 1, further comprising logic configured to send an empty sync message to the client device.

10. A method comprising:
using a synchronization server, engaging in a first synchronization session between a client device and the synchronization server, wherein client modifications and synchronization server modifications are exchanged, the synchronization server modifications based, at least in part, on synchronization data stored locally on the synchronization server;
determining, by the synchronization server, the client modifications based, at least in part, on a digest indicating which client modifications are changes by a user of the client device and which client modifications are changes due to characteristics of the client device;
in response to the first synchronization session, using the synchronization server, querying a remote database on a backend server from the synchronization server to determine differences between the synchronization data stored locally on the synchronization server related to the client device and associated data stored remotely on the remote database; and
using the synchronization server, exchanging further synchronization server modifications based on the differences to the synchronization data stored locally and the associated data stored remotely.

11. The method of claim 10, further comprising engaging in a second synchronization session with the client device to exchange the further synchronization server modifications.

12. The method of claim 11, wherein engaging in a second synchronization session comprises responding to a request from the client device.

13. The method of claim 10, further comprising notifying the client device of updates for the client device after the first synchronization session.

14. The method of claim 10, further comprising sending an empty sync message to the client device.

15. The method of claim 10, further comprising initiating a slow synchronization process with the client device.

16. The method of claim 15, wherein the slow synchronization process comprises comparing Locally Unique Identifiers and Cyclical Redundancy Checks of data items.

17. The method of claim 10, further comprising modulating synchronization data based on the client device.

18. The method of claim 17, wherein the modulation of data is based on capabilities of the client device.

19. A computer-readable storage medium comprising computer-readable instructions tangibly stored thereon for assisting data synchronization between a client device and a synchronization server using a remote database, the computer-readable storage medium comprising:
program code configured to engage in a first synchronization session between the client device and the synchronization server, wherein client modifications and synchronization server modifications are exchanged, the synchronization server modifications based, at least in part, on synchronization data stored locally on the synchronization server;
program code configured to determine the client modifications based, at least in part, on a digest indicating which client modifications are changes by a user of the client device and which client modifications are changes due to characteristics of the client device;
program code configured to initiate a query of a remote database on a backend server from the synchronization server in response to the first synchronization session to determine differences between the synchronization data stored locally on the synchronization server related to the client device and associated data stored remotely on the remote database; and
program code configured to exchange further synchronization server modifications based on the differences between the synchronization data stored locally and the associated data stored remotely.

20. The computer-readable storage medium of claim 19, further comprising program code configured to engage in a second synchronization session with the client device to exchange the further synchronization server modifications.

21. The computer-readable storage medium of claim 20, wherein engaging in a second synchronization session comprises responding to a request from the client device.

22. The computer-readable storage medium of claim 19, further comprising program code configured to notify the client device of updates for the client device after the first synchronization session.

23. The computer-readable storage medium of claim 19, further comprising program code configured to initiate a slow synchronization process with the client device.

24. The computer-readable storage medium of claim 23, wherein the slow synchronization process comprises comparing Locally Unique Identifiers and Cyclical Redundancy Checks of data items.

25. The computer-readable storage medium of claim 19, further comprising program code configured to modulate synchronization data based on the client device.

26. The computer-readable storage medium of claim 25, wherein the modulation of data is based on capabilities of the client device.

27. The computer-readable storage medium of claim 19, further comprising program code configured to send an empty sync message to the client device.

* * * * *